US012413032B2

(12) United States Patent
Zhang et al.

(10) Patent No.: US 12,413,032 B2
(45) Date of Patent: Sep. 9, 2025

(54) ELECTRICAL CONNECTOR ASSEMBLY WITH CONNECTOR ROTATING UNIT

(71) Applicant: LUXSHARE PRECISION ACCESSORY (KUNSHAN) LTD., Kunshan (CN)

(72) Inventors: Lianjie Zhang, Kunshan (CN); Hongwei Sun, Kunshan (CN); Fan Xiao, Kunshan (CN); Chunhe Shi, Kunshan (CN)

(73) Assignee: LUXSHARE PRECISION ACCESSORY (KUNSHAN) LTD., Kunshan (CN)

( * ) Notice: Subject to any disclaimer, the term of this patent is extended or adjusted under 35 U.S.C. 154(b) by 351 days.

(21) Appl. No.: 18/113,690

(22) Filed: Feb. 24, 2023

(65) Prior Publication Data

US 2024/0039221 A1 Feb. 1, 2024

(30) Foreign Application Priority Data

Jul. 26, 2022 (CN) ......................... 202210882908.4

(51) Int. Cl.
*H01R 24/60* (2011.01)
*H01R 13/62* (2006.01)
(Continued)

(52) U.S. Cl.
CPC ......... *H01R 24/60* (2013.01); *H01R 13/6205* (2013.01); *H01R 13/665* (2013.01); *H01R 35/04* (2013.01)

(58) Field of Classification Search
CPC ........ H01R 35/04; H01R 39/64; H01R 24/60; H01R 13/6205; H01R 13/665; H01R 13/502
(Continued)

(56) References Cited

U.S. PATENT DOCUMENTS 8,142,210 B2 * 3/2012 Gao ....................... H01R 35/04 439/131
8,189,101 B2 5/2012 Cummings et al.
(Continued)

FOREIGN PATENT DOCUMENTS

CN 201178198 Y 1/2009
CN 104934834 A 9/2015
(Continued)

*Primary Examiner* — Hae Moon Hyeon
(74) *Attorney, Agent, or Firm* — Birch, Stewart, Kolasch & Birch, LLP

(57) ABSTRACT

An electrical connector assembly includes a housing and a connector rotating unit. The connector rotating unit is rotatable relative to the housing under the action of an external force. The connector rotating unit includes a rotating body, a movable post and an electrical connector. The electrical connector assembly also includes an arc-shaped limiting groove mated with the movable post and an elastic member mated with the movable post. One end of the elastic member is fixed relative to the housing, and another end of the elastic member is connected with the movable post. The movable post is movable in the arc-shaped limiting groove. The elastic member is configured to rotate the connector rotating unit back to an original position after the connector rotating unit is rotated.

20 Claims, 9 Drawing Sheets

(51) Int. Cl.
*H01R 13/66* (2006.01)
*H01R 35/04* (2006.01)

(58) Field of Classification Search
USPC .......................................... 439/11, 13, 21–23
See application file for complete search history.

(56) References Cited

U.S. PATENT DOCUMENTS

| | | | | |
|---|---|---|---|---|
| 8,333,615 | B2 * | 12/2012 | Zhao | H05K 5/0278<br>439/660 |
| 8,616,920 | B2 * | 12/2013 | Pauley | G06K 13/06<br>439/159 |
| 8,753,128 | B2 * | 6/2014 | Alameh | G06F 1/1632<br>439/31 |
| 11,101,584 | B2 * | 8/2021 | Tan | H01R 35/04 |
| 2012/0282805 | A1 * | 11/2012 | Ku | H01R 35/02<br>439/586 |
| 2016/0372857 | A1 * | 12/2016 | Wu | H01R 13/5825 |
| 2021/0194194 | A1 | 6/2021 | Piotrowski | |
| 2022/0021228 | A1 * | 1/2022 | Yan | H01R 35/04 |
| 2024/0088598 | A1 * | 3/2024 | Allaway | H01R 24/60 |

FOREIGN PATENT DOCUMENTS

| | | | |
|---|---|---|---|
| CN | 208226116 | U | 12/2018 |
| CN | 210430370 | U | * 4/2020 |
| CN | 212085281 | U | 12/2020 |
| CN | 112688116 | A | 4/2021 |
| KR | 20180114750 | A | * 10/2018 |
| TW | M621797 | U | 1/2022 |

* cited by examiner

ELECTRICAL CONNECTOR ASSEMBLY WITH CONNECTOR ROTATING UNIT

CROSS-REFERENCE TO RELATED APPLICATION

This patent application claims priority of a Chinese Patent Application No. 202210882908.4, filed on Jul. 26, 2022 and titled "ELECTRICAL CONNECTOR ASSEMBLY", the entire content of which is incorporated herein by reference.

TECHNICAL FIELD

The present disclosure relates to an electrical connector assembly, which belongs to a technical field of connectors.

BACKGROUND

An electrical connector assembly in the related art includes a cable, an electrical connector connected to the cable, and a housing located outside the electrical connector. In some applications, the electrical connector needs to be able to rotate at a certain angle to better mate with a mating connector. However, how to return the electrical connector back to its original position is a technical problem to be solved by those skilled in the art.

SUMMARY

An object of the present disclosure is to provide an electrical connector assembly with a function of returning to an original/normal position.

In order to achieve the above object, the present disclosure adopts the following technical solution: an electrical connector assembly, including: a housing; and a connector rotating unit, the connector rotating unit being rotatable relative to the housing under an action of an external force, the connector rotating unit including a rotating body, a movable post and an electrical connector fixedly connected with the rotating body, the electrical connector at least partially extending beyond the housing; wherein the electrical connector assembly is further provided with an arc-shaped limiting groove mated with the movable post and an elastic member mated with the movable post; one end of the elastic member is fixed relative to the housing, and another end of the elastic member is connected to the movable post; the movable post is movable in the arc-shaped limiting groove; the elastic member is configured to drive the movable post by a restoring force of the elastic member after the connector rotating unit is rotated, so as to rotate the connector rotating unit back to an original position.

In order to achieve the above object, the present disclosure adopts the following technical solution: an electrical connector assembly, including: a housing including a first housing and a second housing, the first housing defining a first accommodating space, the second housing defining a second accommodating space; and a connector rotating unit, the connector rotating unit being rotatable relative to the housing under an action of an external force, the connector rotating unit including a rotating body, a movable post and an electrical connector fixedly connected with the rotating body, the rotating body being at least partially received in the first accommodating space and the second accommodating space, the electrical connector at least partially extending beyond the housing; wherein the electrical connector assembly is further provided with a limiting groove and an elastic member; one end of the elastic member is fixed relative to the housing, and another end of the elastic member is connected to the movable post; the movable post is movable in the limiting groove when the connector rotating unit is rotating; the elastic member is configured to drive the movable post by a restoring force of the elastic member so as to rotate the connector rotating unit back to an original position.

Compared with the prior art, the present disclosure is provided with a movable post capable of moving in the arc-shaped limiting groove. The elastic member is configured to automatically rotate the connector rotating unit back to the original/normal position by causing the restoring force of the elastic member to drive the movable post after the connector rotating unit is rotated.

DETAILED DESCRIPTION

Figure 1:
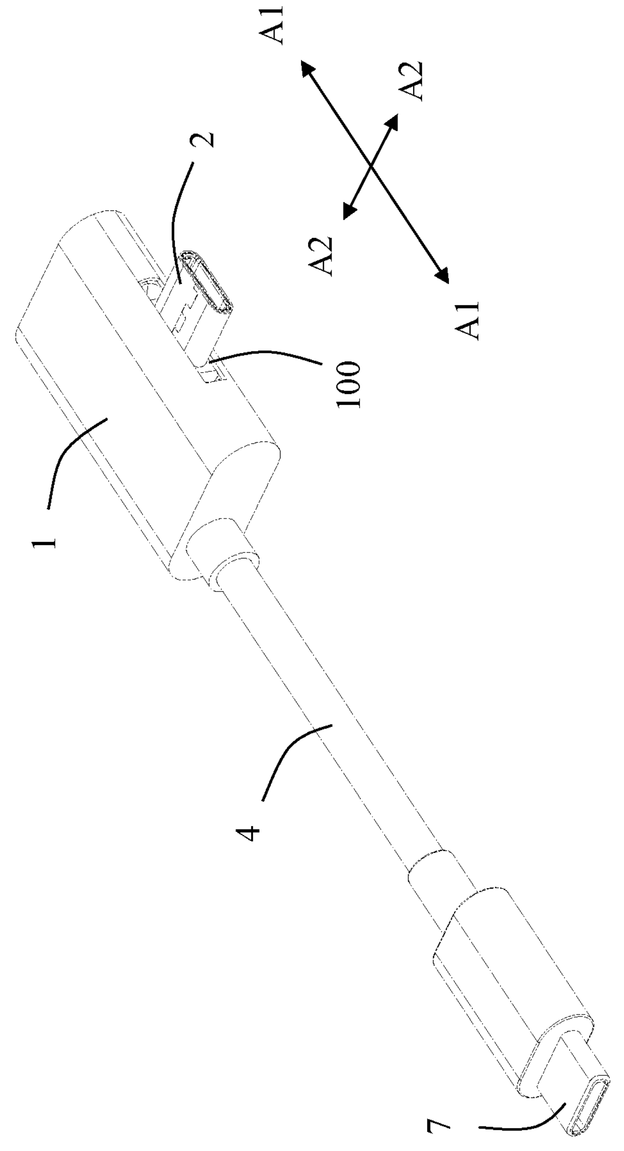
FIG. 1 is a schematic perspective view of an electrical connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 9, an illustrated embodiment of the present disclosure discloses an electrical connector assembly, which includes a housing 1, a connector rotating unit 2, a plurality of magnets and a cable 4. In the illustrated embodiment of the present disclosure, the housing 1 includes an outer housing 10, a first housing 11, a second housing 12, and a side housing 13. The first housing 11 is mated with the second housing 12. Both the first housing 11 and the second housing 12 are located in the outer housing 10. The side housing 13 is at least partially inserted into the outer housing 10 from one side and locked with the outer housing 10.

The housing 1 defines a slot 100 extending in a first direction A1-A1. In the illustrated embodiment of the present disclosure, part of the slot 100 is provided in the outer housing 10, and another part of the slot 100 is provided in the side housing 13. In other words, the slot 100 is jointly formed by the outer housing 10 and the side housing 13.

Figure 3:
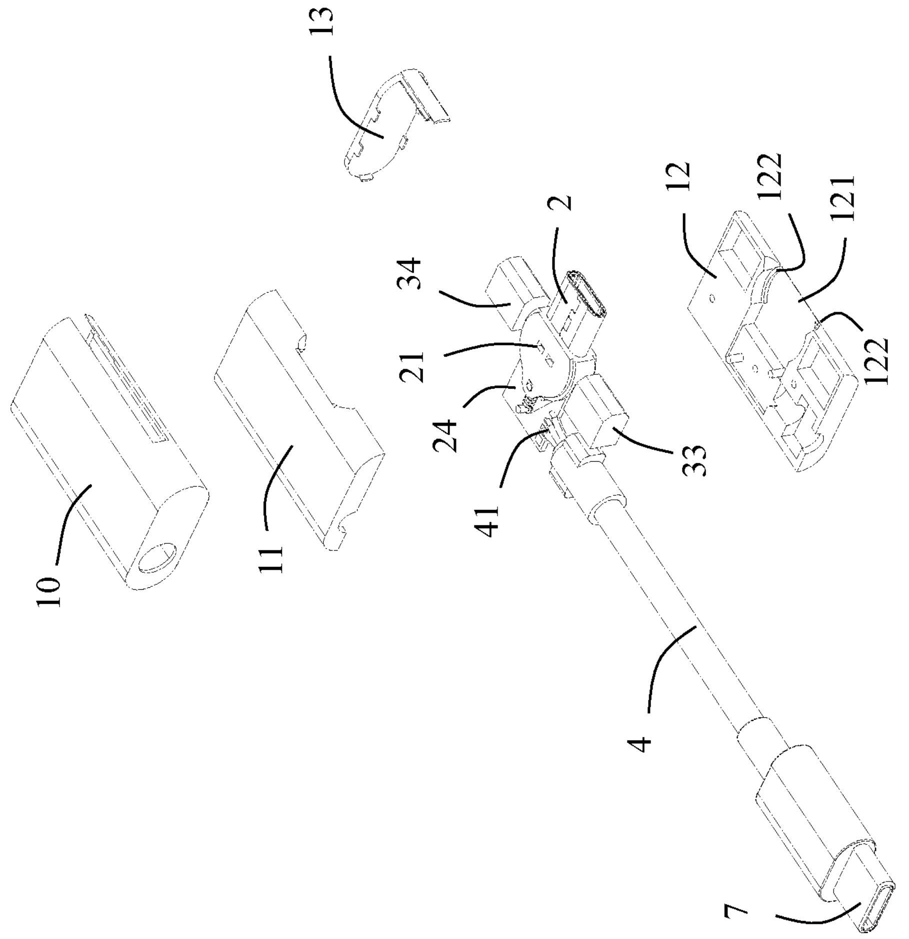
FIG. 3 is a partial perspective exploded view of FIG. 1.
Figure 4:
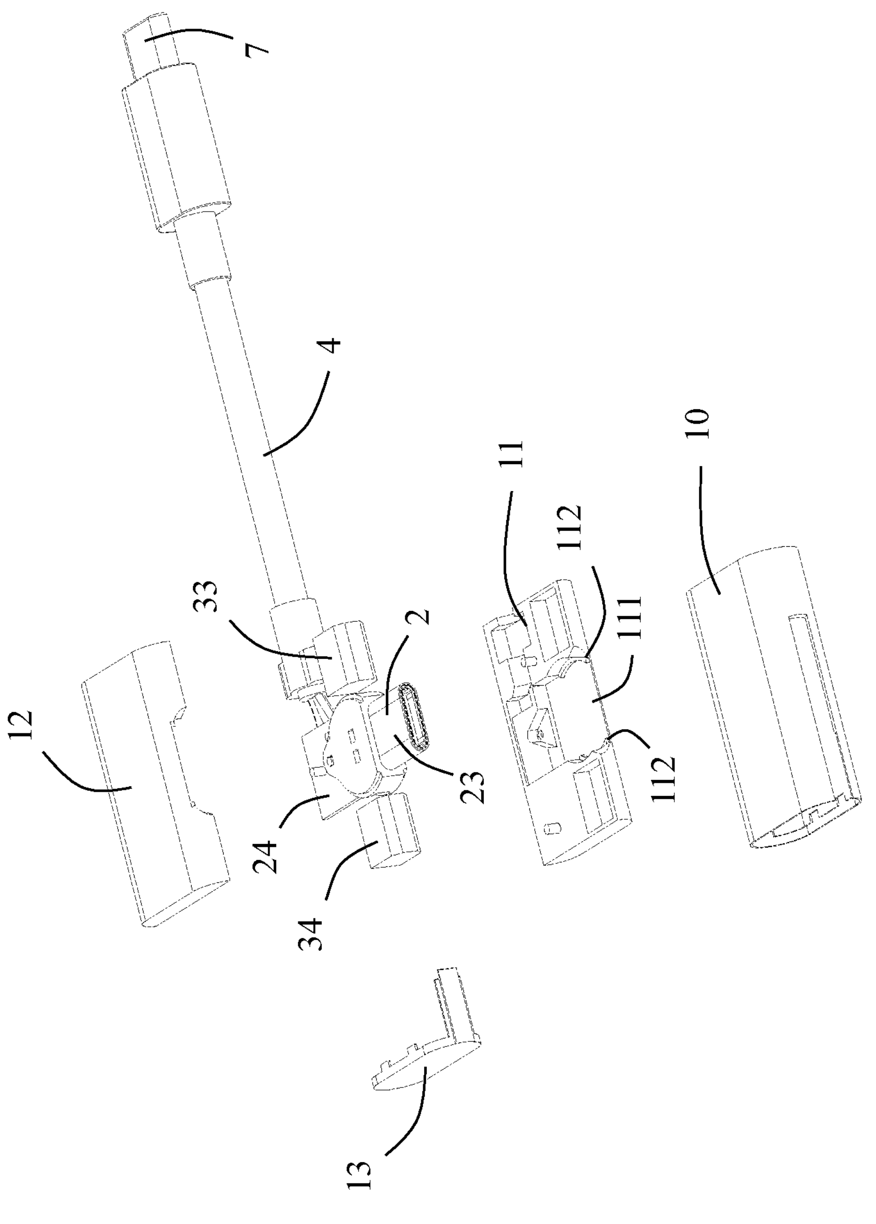
FIG. 4 is a partial perspective exploded view of FIG. 3 from another angle.

Referring to FIG. 3 and FIG. 4, the first housing 11 includes a first accommodating space 111 and two first arc-shaped supporting portions 112 located on two sides of the first accommodating space 111, respectively. The two first arc-shaped supporting portions 112 are exposed in the first accommodating space 111.

Similarly, the second housing 12 includes a second accommodating space 121 and two second arc-shaped supporting portions 122 located on two sides of the second accommodating space 121, respectively. The two second arc-shaped supporting portions 122 are exposed in the second accommodating space 121.

Figure 2:
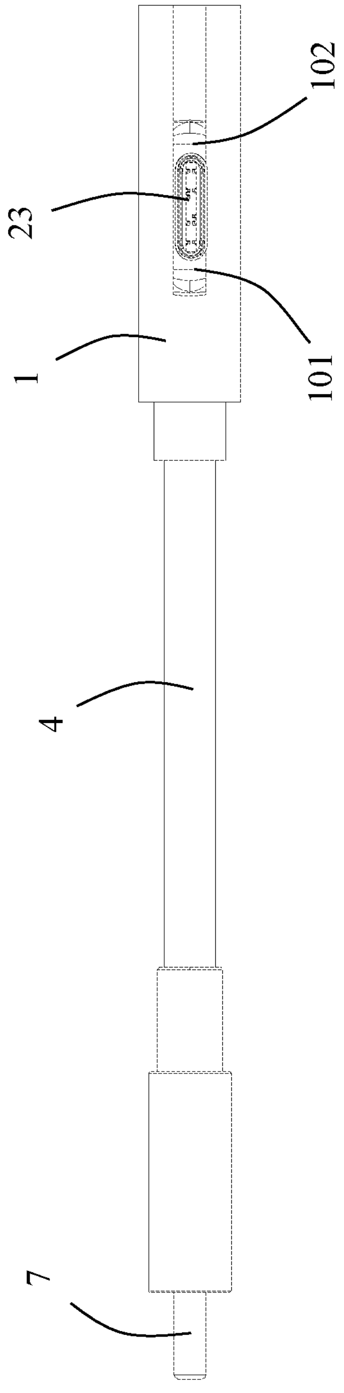
FIG. 2 is a front view of FIG. 1.

The connector rotating unit 2 is rotatable relative to the housing 1 under the action of an external force. In the embodiment shown in the present disclosure, the connector rotating unit 2 includes a rotating body 21, a movable post 25 and an electrical connector 23 fixedly connected to the rotating body 21. The electrical connector 23 passes through the slot 100 in a second direction A2-A2 perpendicular to the first direction A-A1 so as to at least partially extend beyond the housing 1. Referring to FIG. 1 and FIG. 2, the slot 100 includes a first groove 101 on one side of the electrical connector 23 and a second groove 102 on another side of the electrical connector 23. The first groove 101 and the second groove 102 are configured to provide a space for the electrical connector 23 to rotate left and right.

It is understandable to those skilled in the art that, in an embodiment of the present disclosure, a pivot (not shown) is provided between the rotating body 21 and the housing 1. The rotating body 21 is rotatable relative to the housing 1 with the pivot as a center of rotation. Of course, it is understandable to those of ordinary skill in the art that, in other embodiments, the rotating body 21 can also rotate relative to the housing 1 by means of other structural designs, which will not be repeated in the present disclosure.

The electrical connector assembly is further provided with an arc-shaped limiting groove 240 mated with the movable post 25 and an elastic member mated with the movable post 25. One end of the elastic member is fixed relative to the housing 1, and the other end of the elastic member is connected to the movable post 25. The movable post 25 is movable in the arc-shaped limiting groove 240. The elastic member is configured to drive the movable post 25 by a restoring force of the elastic member after the connector rotating unit 2 is rotated, so as to rotate the connector rotating unit 2 back to its original/normal position.

Figure 5:
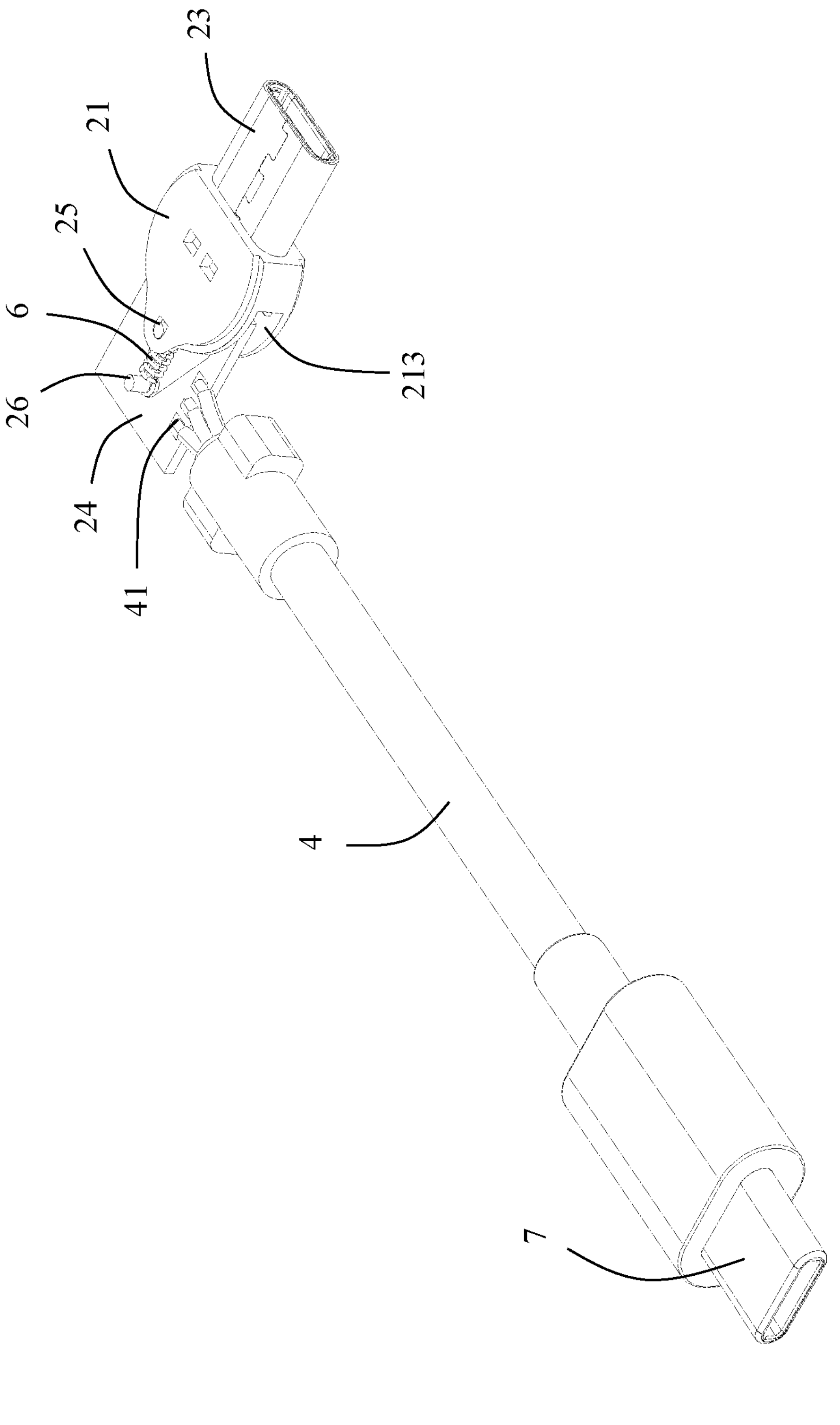
FIG. 5 is a perspective view after removing a housing and magnets in FIG. 3.
Figure 6:
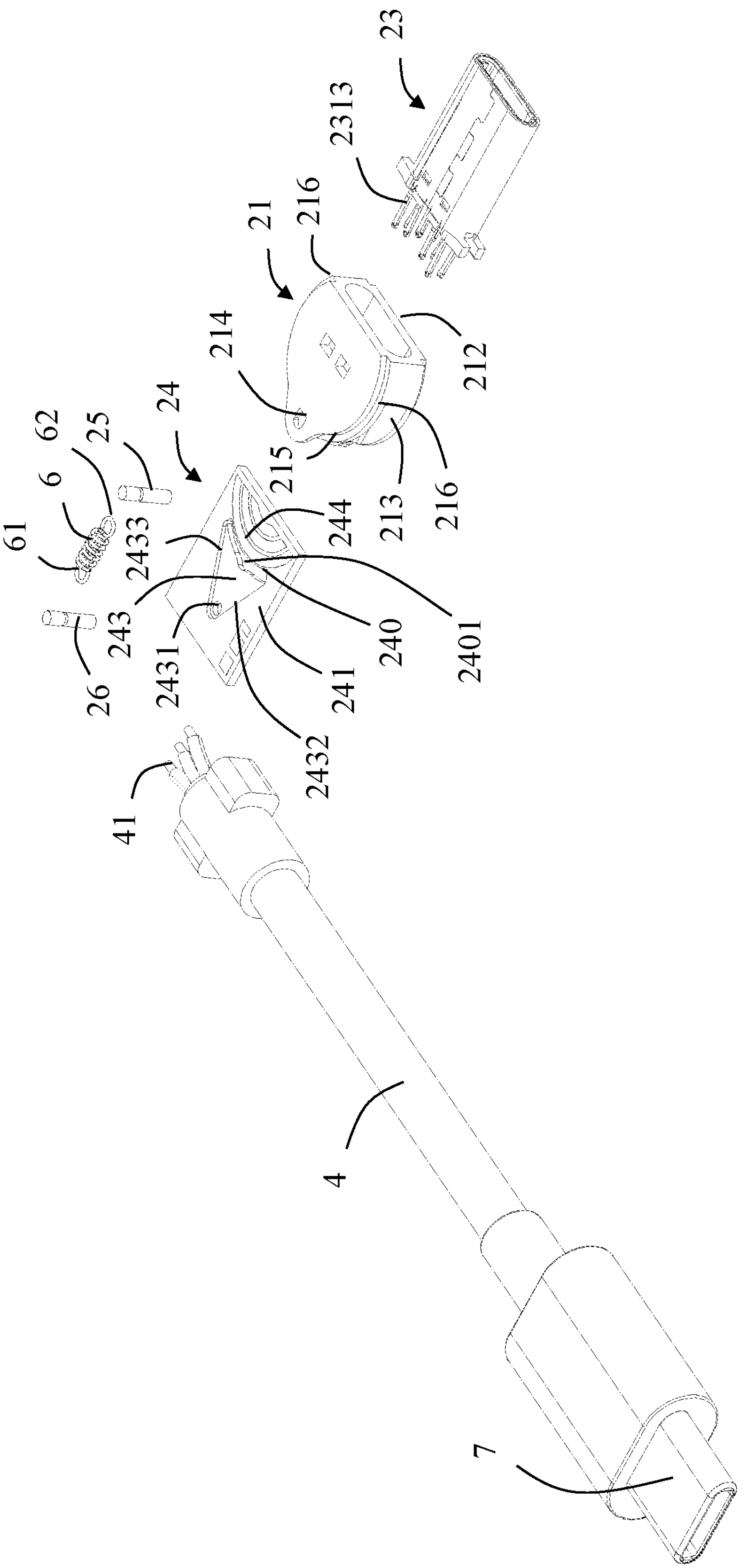
FIG. 6 is a perspective exploded view of FIG. 5.
Figure 7:
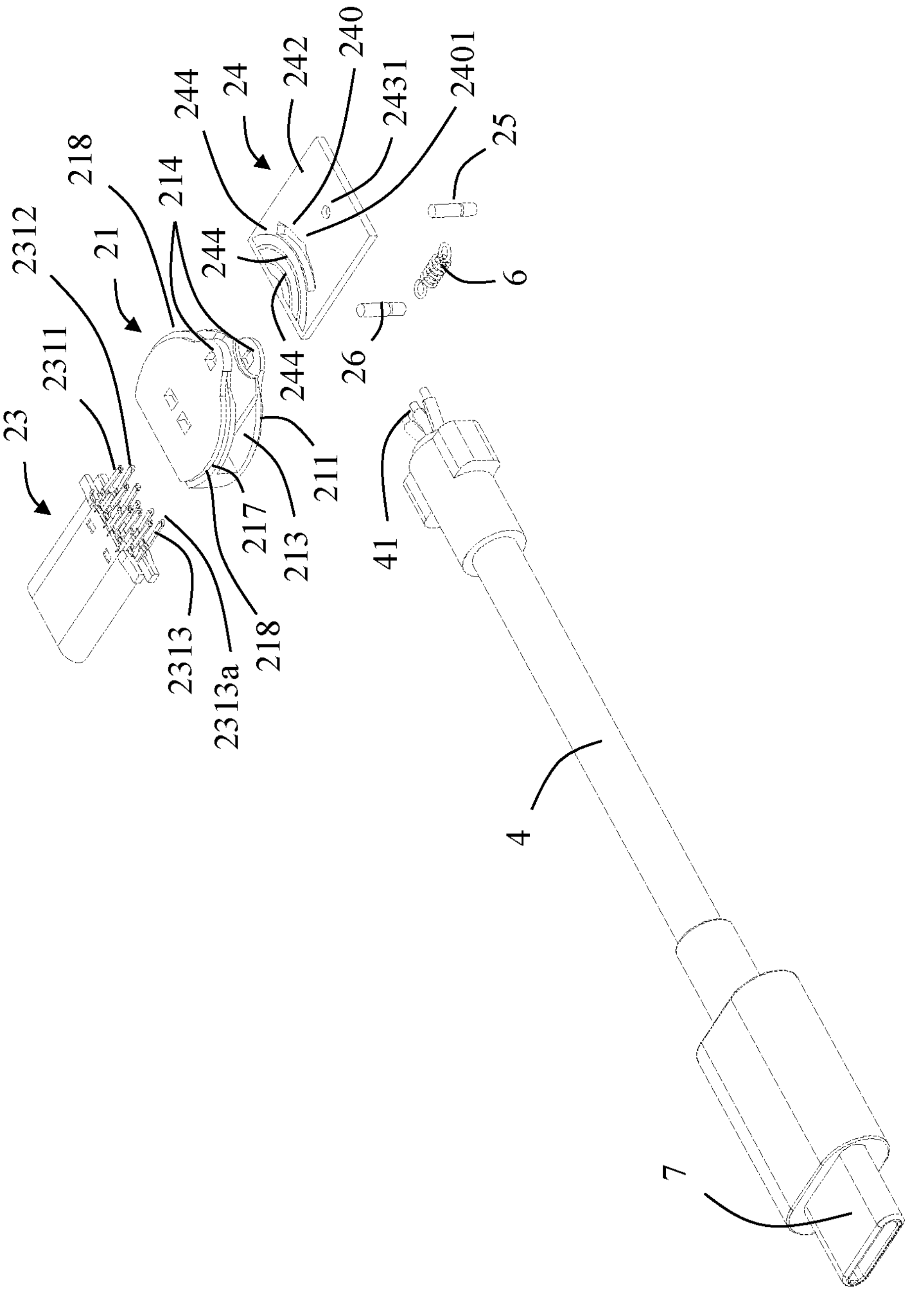
FIG. 7 is a perspective exploded view of FIG. 6 from another angle.

Referring to FIG. 5 to FIG. 7, the rotating body 21 is generally of a D-shaped configuration, which includes an arc surface 211, a flat surface 212, a receiving slot 213 extending through the arc surface 211, and an insertion hole 214 extending through the rotating body 21. In the embodiment shown in the present disclosure, the movable post 25 is fixed in the insertion hole 214, so that the movable post 25 can rotate together with the rotating body 21. The rotating body 21 includes a first arc-shaped groove 215 mated with the first arc-shaped supporting portions 112, a first abutting surface 216 exposed in the first arc-shaped groove 215, a second arc-shaped groove 217 mated with the second arc-shaped supporting portions 122, and a second abutting surface 218 exposed in the second arc-shaped groove 217. After assembly, the rotating body 21 is located between the first housing 11 and the second housing 12. The rotating body 21 is accommodated in the first accommodating space 111 and the second accommodating space 121. In the embodiment shown in the present disclosure, the first arc-shaped supporting portion 112 mates with the first abutting surface 216 to prevent the rotating body 21 from moving upwardly. The second arc-shaped supporting portion 122 mates with the second abutting surface 218 to prevent the rotating body 21 from moving downwardly. However, the rotating body 21 can still rotate in a horizontal plane.

In the illustrated embodiment of the present disclosure, the electrical connector assembly includes a built-in circuit board 24 and a cable 4. The arc-shaped limiting groove 240 is formed on the built-in circuit board 24. The cable 4 includes a plurality of conductive portions 41. The plurality of conductive portions 41 are electrically connected to the built-in circuit board 24. Specifically, in the embodiments shown in the present disclosure, the built-in circuit board 24 includes a first surface 241, a second surface 242 opposite to the first surface 241, and a counterbore area 243 recessed from the first surface 241 toward the second surface 242. The counterbore area 243 is provided with a mounting hole 2431 extending through the second surface 242. The arc-shaped limiting groove 240 is located adjacent to the counterbore area 243. The built-in circuit board 24 further includes a plurality of arc-shaped conductive pads 244 arranged at intervals. In the embodiment shown in the present disclosure, the plurality of arc-shaped conductive pads 244 are located on the first surface 241 and the second surface 242 of the built-in circuit board 24. For the plurality of arc-shaped conductive pads 244 located on the same side, arc lengths of the plurality of arc-shaped conductive pads 244 decrease sequentially along a direction away from the arc-shaped limiting groove 240. In the embodiment shown in the present disclosure, the counterbore area 243 includes a first limiting side surface 2432 on one side and a second limiting side surface 2433 on an opposite side. The first limiting side surface 2432 and the second limiting side surface 2433 form an included angle. The mounting hole 2431 is approximately located at an apex of the included angle. The arc-shaped limiting groove 240 is curved toward a direction of the mounting hole 2431.

In the illustrated embodiment of the present disclosure, the electrical connector 23 is a connector plug (e.g., a Universal Serial Bus (USB) Type C plug), which includes a plurality of conductive terminals 231 corresponding to the plurality of arc-shaped conductive pads 244. Each of the plurality of conductive terminals 231 is always in contact with a corresponding arc-shaped conductive pad 244 no matter whether the connector rotating unit 2 rotates or not. The plurality of conductive terminals 231 protrude toward the built-in circuit board 24 in a cantilever shape. Specifically, the plurality of conductive terminals 231 include a plurality of cantilever portions 2313 protruding toward the built-in circuit board 24. Each cantilever portion 2313 is provided with a dimple 2313*a* (see FIG. 7) which is in contact with the corresponding arc-shaped conductive pad 244. In the embodiment shown in the present disclosure, the plurality of conductive terminals 231 include a first row of conductive terminals 2311 and a second row of conductive terminals 2312.

The built-in circuit board 24 is clamped between the first row of conductive terminals 2311 and the second row of conductive terminals 2312. Regardless of the position of the connector rotating unit 2, the first row of conductive terminals 2311 and the second row of conductive terminals 2312 are always in contact with the built-in circuit board 24. The built-in circuit board 24 is received in the receiving slot 213 of the rotating body 2. The built-in circuit board 24 is fixed relative to the housing 1, that is, the built-in circuit board 24 will not rotate with the rotation of the connector rotating unit 2.

In the illustrated embodiment of the present disclosure, the elastic member is a tension spring 6. The electrical connector assembly is provided with a fixing post 26 which is fixed in the mounting hole 2431 of the built-in circuit board 24. One end of the tension spring 6 is fixed to the fixing post 26, and the other end of the tension spring 6 is connected to the movable post 25.

Specifically, referring to FIG. 5 to FIG. 9, in the embodiment illustrated in the present disclosure, the tension spring 6 includes a first annular portion 61 located at one end of the tension spring 6 and a second annular portion 62 located at the other end of the tension spring 6. The first annular portion 61 is sleeved on the fixing post 26. The second annular portion 62 is sleeved on the movable post 25. The tension spring 6 is located at least partially in the counterbore area 243. The tension spring 6 is limited between the first limiting side surface 2432 and the second limiting side surface 2433 when the connector rotating unit 2 rotates.

The arc-shaped limiting groove 240 includes a stop recess 2401 at the top thereof. After the connector rotating unit 2 is rotated from a rotated position back to the original/normal position, the movable post 25 is at least partially positioned in the stop recess 2401. It is understandable to those skilled in the art that, in the embodiment shown in the present disclosure, the stop recess 2401 deviates outward from other portions of the arc-shaped limit groove 240. That is, the stop recess 2401 and other portions of the arc-shaped limiting groove 240 are not smoothly communicated. The design advantage of the stop recess 2401 is that it has a certain foolproof effect when the connector rotating unit 2 is rotated back to the original/normal position. That is, the movable post 25 needs a relatively large force to realize a second rotation.

The plurality of magnets include a first magnet 33 and a second magnet 34 disposed in the housing 1. The first magnet 33 and the second magnet 34 are located on two sides (e.g., left and right sides) of the rotating body 21, respectively. The first magnet 33 and the second magnet 34 are configured to be attracted to a magnetic attraction element (e.g., a magnet or an iron) of a mating device, so as to improve the mating reliability. It should be noted that the technical term "magnetic attraction element" used in the present disclosure is intended to indicate that the element can attract or repel a corresponding element by utilizing the principle of a magnetic field.

The electrical connector assembly further includes another electrical connector 7 connected to the cable 4. The another electrical connector 7 is electrically connected to the electrical connector 23 via the cable 4 and the built-in circuit board 24. In the embodiment of the present disclosure, the another electrical connector 7 may be a USB Type C plug, a USB Type A plug, a Micro USB plug, a High Definition Multimedia Interface (HDMI) plug, a DisplayPort plug, a Thunderbolt plug, or the like.

Figure 8:
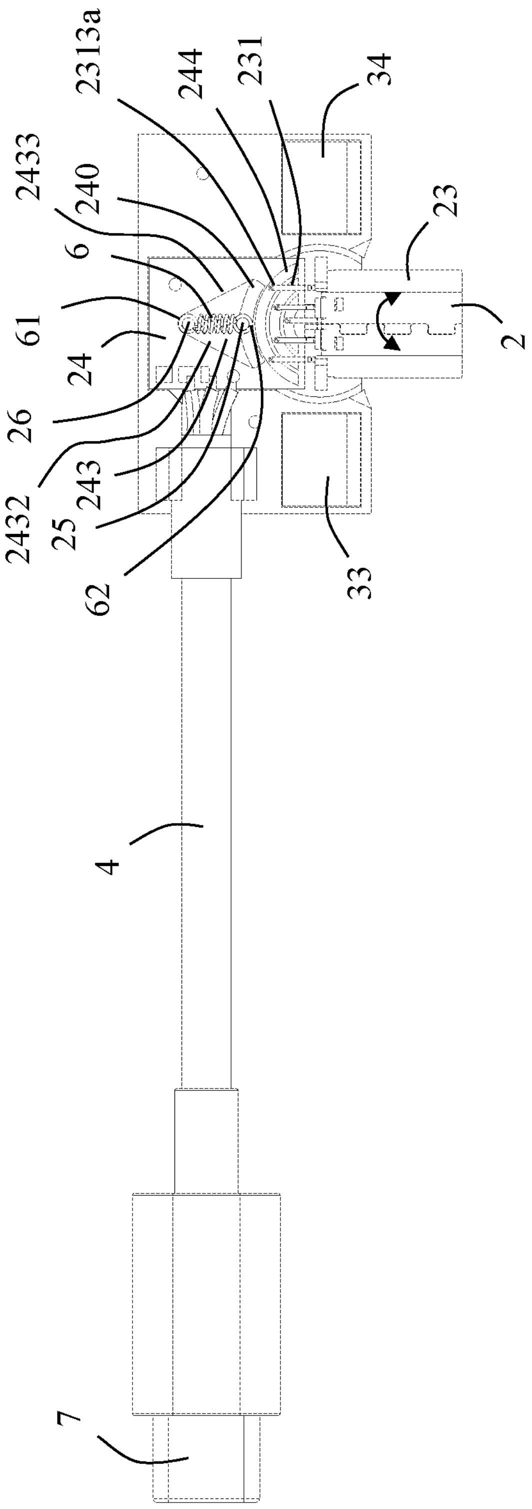
FIG. 8 is a top view of partial elements of the electrical connector assembly of FIG. 3 when the partial elements are assembled together, wherein a connector rotating unit is located in an original/normal position.
Figure 9:
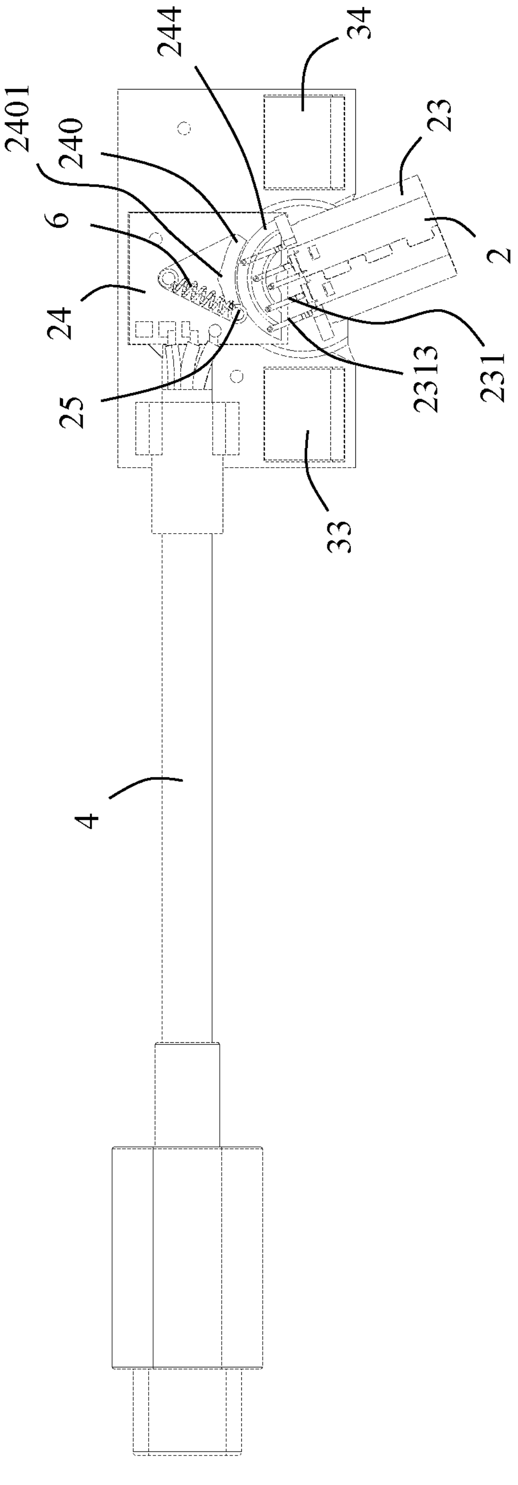
FIG. 9 is atop view of FIG. 8 from another angle, wherein the connector rotating unit is located in a rotated position.

Referring to FIG. 8 and FIG. 9, during use, when an external force acting on the connector rotating unit 2 overcomes an engaging force between the movable post 25 and the stop recess 2401, the connector rotating unit 2 is driven to rotate by the external force. The movable post 25 moves in the arc-shaped limiting groove 240. The tension spring 6 is stretched to generate a certain restoring force. When the external force disappears, the restoring force of the tension spring 6 drives the movable post 25 automatically to return to the stop recess 2401, thereby rotating the connector rotating unit 2 back to the original/normal position. As a result, the user experience is greatly improved.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector assembly, comprising:

a housing;

a connector rotating unit, the connector rotating unit being rotatable under an action of an external force, the connector rotating unit comprising a rotating body, a movable post and an electrical connector fixedly connected with the rotating body, the electrical connector at least partially extending beyond the housing;

a board, the board being secured to the housing, and the board defining an arc-shaped limiting groove mated with the movable post;

a fixing post, the fixing post being secured to the board; and an elastic member mated with the fixing post and the movable post; wherein one end of the elastic member is mounted to the fixing post, and another end of the elastic member is connected to the movable post; the movable post is movable in the arc-shaped limiting groove; the elastic member is configured to drive the movable post by a restoring force of the elastic member after the connector rotating unit is rotated, so as to rotate the connector rotating unit back to an original position.

2. The electrical connector assembly according to claim 1, wherein the elastic member is a tension spring, one end of the tension spring is fixed to the fixing post, and another end of the tension spring is connected to the movable post.

3. The electrical connector assembly according to claim 2, wherein the tension spring comprises a first annular portion located at one end of the tension spring and a second annular portion located at another end of the tension spring; and wherein the first annular portion is sleeved on the fixing post, and the second annular portion is sleeved on the movable post.

4. The electrical connector assembly according to claim 2, wherein the board is a built-in circuit board.

5. The electrical connector assembly according to claim 4, wherein the built-in circuit board comprises a first surface, a second surface opposite to the first surface, and a counterbore area recessed from the first surface toward the second surface, the counterbore area is provided with a mounting hole extending through the second surface, the mounting hole is configured for mounting the fixing post, and the arc-shaped limiting groove is located adjacent to the counterbore area.

6. The electrical connector assembly according to claim 4, wherein the built-in circuit board further comprises a plurality of arc-shaped conductive pads arranged at intervals, the electrical connector comprises a plurality of conductive terminals corresponding to the plurality of arc-shaped conductive pads, the plurality of conductive terminals are always in contact with the plurality of arc-shaped conductive pads when the connector rotating unit rotates.

7. The electrical connector assembly according to claim 6, wherein arc lengths of the plurality of arc-shaped conductive pads decrease sequentially along a direction away from the arc-shaped limiting groove, each conductive terminal comprises a cantilever portion protruding toward the built-in circuit board, and each cantilever portion is provided with a dimple in contact with a corresponding arc-shaped conductive pad.

8. The electrical connector assembly according to claim 1, further comprising a first magnet and a second magnet; wherein the first magnet and the second magnet are mounted to the housing, and are configured to be attracted to a magnetic attraction element of a mating device.

9. The electrical connector assembly according to claim 4, further comprising a cable having a plurality of conductive portions; wherein the plurality of conductive portions are electrically connected to the built-in circuit board; the cable extends out of the housing.

10. The electrical connector assembly according to claim 1, wherein the arc-shaped limiting groove comprises a stop recess at a top thereof; and wherein after the connector rotating unit is rotated back to the original position, the movable post is at least partially positioned in the stop recess.

11. An electrical connector assembly, comprising:

a housing comprising a first housing and a second housing, the first housing defining a first accommodating space, the second housing defining a second accommodating space; and a connector rotating unit, the connector rotating unit being rotatable under an action of an external force, the connector rotating unit comprising a rotating body, a movable post and an electrical connector fixedly connected with the rotating body, the rotating body being at least partially received in the first accommodating space and the second accommodating space, the electrical connector at least partially extending beyond the housing;

a board, the board being secured to the housing, and the board defining a limiting groove;

a fixing post, the fixing post being secured to the board; and an elastic member at least partially disposed between the first housing and the second housing; wherein one end of the elastic member is mounted to the fixing post, and another end of the elastic member is connected to the movable post; the movable post is movable in the limiting groove when the connector rotating unit is rotating; the elastic member is configured to drive the movable post by a restoring force of the elastic member so as to rotate the connector rotating unit back to an original position.

12. The electrical connector assembly according to claim 11, wherein the elastic member is a tension spring, one end of the tension spring is fixed to the fixing post, and another end of the tension spring is connected to the movable post.

13. The electrical connector assembly according to claim 12, wherein the tension spring comprises a first annular portion located at one end of the tension spring and a second annular portion located at another end of the tension spring; and wherein the first annular portion is sleeved on the fixing post, and the second annular portion is sleeved on the movable post.

14. The electrical connector assembly according to claim 12, wherein the board is a built-in circuit board.

15. The electrical connector assembly according to claim 14, wherein the built-in circuit board comprises a first surface, a second surface opposite to the first surface, and a counterbore area recessed from the first surface toward the second surface, the counterbore area is provided with a mounting hole extending through the second surface, the mounting hole is configured for mounting the fixing post, and the limiting groove is located adjacent to the counterbore area.

16. The electrical connector assembly according to claim 14, wherein the built-in circuit board further comprises a plurality of arc-shaped conductive pads arranged at intervals, the electrical connector comprises a plurality of conductive terminals corresponding to the plurality of arc-shaped conductive pads, the plurality of conductive terminals are always in contact with the plurality of arc-shaped conductive pads when the connector rotating unit rotates.

17. The electrical connector assembly according to claim 16, wherein arc lengths of the plurality of arc-shaped conductive pads decrease sequentially along a direction away from the limiting groove, each conductive terminal comprises a cantilever portion protruding toward the built-in circuit board, and each cantilever portion is provided with a dimple in contact with a corresponding arc-shaped conductive pad.

18. The electrical connector assembly according to claim 14, further comprising a cable having a plurality of conductive portions; wherein the plurality of conductive portions are electrically connected to the built-in circuit board; the cable extends out of the housing.

19. The electrical connector assembly according to claim 11, wherein the limiting groove is of an arc-shaped configuration and comprises a stop recess at a top thereof; and wherein after the connector rotating unit is rotated back to the original position, the movable post is at least partially positioned in the stop recess.

20. The electrical connector assembly according to claim 11, wherein the first housing comprises two first arc-shaped supporting portions located on two sides of the first accommodating space, respectively;

the second housing comprises two second arc-shaped supporting portions located on two sides of the second accommodating space, respectively;

the rotating body comprises a first arc-shaped groove mating with the first arc-shaped supporting portions and a second arc-shaped groove mating with two second arc-shaped supporting portions.

* * * * *